(12) United States Patent
Hurtarte et al.

(10) Patent No.: US 10,012,721 B2
(45) Date of Patent: Jul. 3, 2018

(54) VIRTUAL DISTANCE TEST TECHNIQUES FOR RADAR APPLICATIONS

(71) Applicant: Teradyne, Inc., North Reading, MA (US)

(72) Inventors: Jeorge S. Hurtarte, Wilmington, MA (US); Daniel A. Rosenthal, Boxford, MA (US)

(73) Assignee: Teradyne, Inc., North Reading, MA (US)

( * ) Notice: Subject to any disclaimer, the term of this patent is extended or adjusted under 35 U.S.C. 154(b) by 592 days.

(21) Appl. No.: 14/626,252

(22) Filed: Feb. 19, 2015

(65) Prior Publication Data

US 2016/0245900 A1    Aug. 25, 2016

(51) Int. Cl.
G01S 7/40      (2006.01)

(52) U.S. Cl.
CPC .......... *G01S 7/4052* (2013.01); *G01S 7/4056* (2013.01); *G01S 2007/4086* (2013.01); *G01S 2007/4095* (2013.01)

(58) Field of Classification Search
CPC ................. G01S 7/4052; G01S 7/4056; G01S 2007/4086; G01S 2007/4095; G01S 7/40; G01S 2007/4082
USPC ........................................................ 342/172
See application file for complete search history.

(56) References Cited

U.S. PATENT DOCUMENTS

| | | | |
|---|---|---|---|
| 5,841,393 A | 11/1998 | Saito et al. | |
| 5,886,663 A * | 3/1999 | Broxon, II | G01S 7/4052 342/165 |
| 7,343,279 B2 | 3/2008 | Truebenbach et al. | |
| 7,908,531 B2 | 3/2011 | Fairbanks et al. | |
| 2005/0190101 A1 | 9/2005 | Hiramatsu et al. | |
| 2006/0244654 A1 * | 11/2006 | Cheng | G01S 7/4056 342/165 |

(Continued)

FOREIGN PATENT DOCUMENTS

| | | | |
|---|---|---|---|
| JP | 2005-241330 A | 9/2005 | |
| WO | WO 2014/112929 A1 | 7/2014 | |
| WO | WO 2014112929 A1 * | 7/2014 | ........... G01S 7/4056 |

OTHER PUBLICATIONS

International Search Report and Written Opinion for International Application No. PCT/US2016/018638 dated Jun. 3, 2016.

(Continued)

*Primary Examiner* — Peter M Bythrow
(74) *Attorney, Agent, or Firm* — Wolf, Greenfield & Sacks, P.C.

(57) ABSTRACT

A testing device for testing a radar device. The testing device may be configured to determine a first frequency difference between a frequency of a first signal or a second signal and a frequency of a third signal based on a first distance value; transmit to the radar device the first signal; receive the second signal from the radar device; transmit to the radar device the third signal at an offset relative to at least one of the first signal and the second signal based on the first frequency difference; and receive from the radar device a fourth signal indicating a second distance value or a second frequency difference between the frequency of the second signal and the frequency of the third signal, determined by the radar device, for comparison with the first distance value or the first frequency difference.

40 Claims, 7 Drawing Sheets

(56) References Cited

U.S. PATENT DOCUMENTS

2015/0219752 A1\* 8/2015 Lewis ................ G01S 7/40
                                              342/104
2015/0362584 A1\* 12/2015 Jenkins ............ G01S 7/4056
                                              342/171

OTHER PUBLICATIONS

Peter Deacon et al., "Frequency Modulated Continuous Wave (FMCW) Radar," Design Team 6 Technical Lecture, Nov. 9, 2011, 27 pages.

\* cited by examiner

VIRTUAL DISTANCE TEST TECHNIQUES FOR RADAR APPLICATIONS

DISCUSSION OF RELATED ART

Radar devices are becoming more common, especially in automotive scenarios, for detecting the distance between the radar device and a target object or objects. These radar devices should be tested before being used. Testing a radar device may require simulating a variable physical distance between the radar device and a target object. This can be done by varying a physical separation between the radar device and a target object or by providing several delay lines of various length of fiber, copper coaxial cable, or waveguide as the transmission medium between the radar device transmitter and its receiver.

SUMMARY

Some aspects include a testing device for testing a radar device. The testing device may be configured to determine a first frequency difference between a frequency of a first signal or a second signal and a frequency of a third signal based on a first distance value; transmit to the radar device the first signal; receive the second signal from the radar device; transmit to the radar device the third signal at an offset relative to at least one of the first signal and the second signal based on the first frequency difference; and receive from the radar device a fourth signal indicating a second distance value or a second frequency difference between the frequency of the second signal and the frequency of the third signal, determined by the radar device, for comparison with the first distance value or the first frequency difference.

Further aspects include a method of testing a radar device. The method may comprise determining a first frequency difference between a frequency of a first signal or a second signal and a frequency of a third signal based on a first distance value; transmitting to the radar device the first signal; receiving the second signal from the radar device; transmitting to the radar device the third signal at an offset relative to at least one of the first signal and the second signal based on the first frequency difference; and receiving from the radar device a fourth signal, indicating a second distance value or a second frequency difference between the frequency of the second signal and the frequency of the third signal, determined by the radar device, for comparison with the first distance value or the first frequency difference.

Additional aspects include a system configured for testing a radar device. The system may comprise a testing device configured to determine a first frequency difference between a frequency of a first signal or a second signal and a frequency of a third signal based on a first distance value; transmit to the radar device the first signal; receive the second signal from the radar device; transmit to the radar device the third signal at an offset relative to at least one of the first signal and the second signal based on the first frequency difference; and receive from the radar device a fourth signal, indicating a second distance value or a second frequency difference between the frequency of the second signal and the frequency of the third signal, determined by the radar device, for comparison with the first distance value or the first frequency difference. The system may further comprise a radar device configured to receive the first signal from the testing device; transmit to the testing device the second signal; receive the third signal from the testing device; and transmit to the testing device the fourth signal.

The foregoing is a non-limiting summary of the invention as defined by the appended claims.

BRIEF DESCRIPTION OF THE FIGURES

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

The inventors have recognized and appreciated that testing a radar device may be significantly less expensive, less time-consuming, and more compact using all-electronic virtual distance techniques as compared to using conventional techniques.

In particular, the conventional technique of varying a physical separation between the radar device and the target object may be very expensive and time-consuming due to the need to provide a physical object and to physically displace the object and/or the radar device in order to vary the distance simulated. This technique also may require a large amount of space to test even a single radar device, as the distances simulated may be actual distances, which can be from a few centimeters or less to 150 meters or more.

The conventional technique of providing several delay lines of various length of fiber, copper coaxial cable, or waveguide as the transmission medium between the radar device transmitter and its receiver may also be very expensive and time-consuming due to the need to provide the various physical lines of the medium and change the line of medium used in order to vary the distance simulated. Moreover, even if the medium is coiled, this technique may still require significantly more space than using all-electronic virtual distance techniques, as a physical length is still provided that matches the simulated length described above.

The inventors have recognized and appreciated that tester hardware using all-electronic virtual distance techniques may be lower cost, use less time, and take less space than the tester hardware of conventional techniques, especially in a high volume testing environment in which numerous radar devices may be tested.

Figure 1:
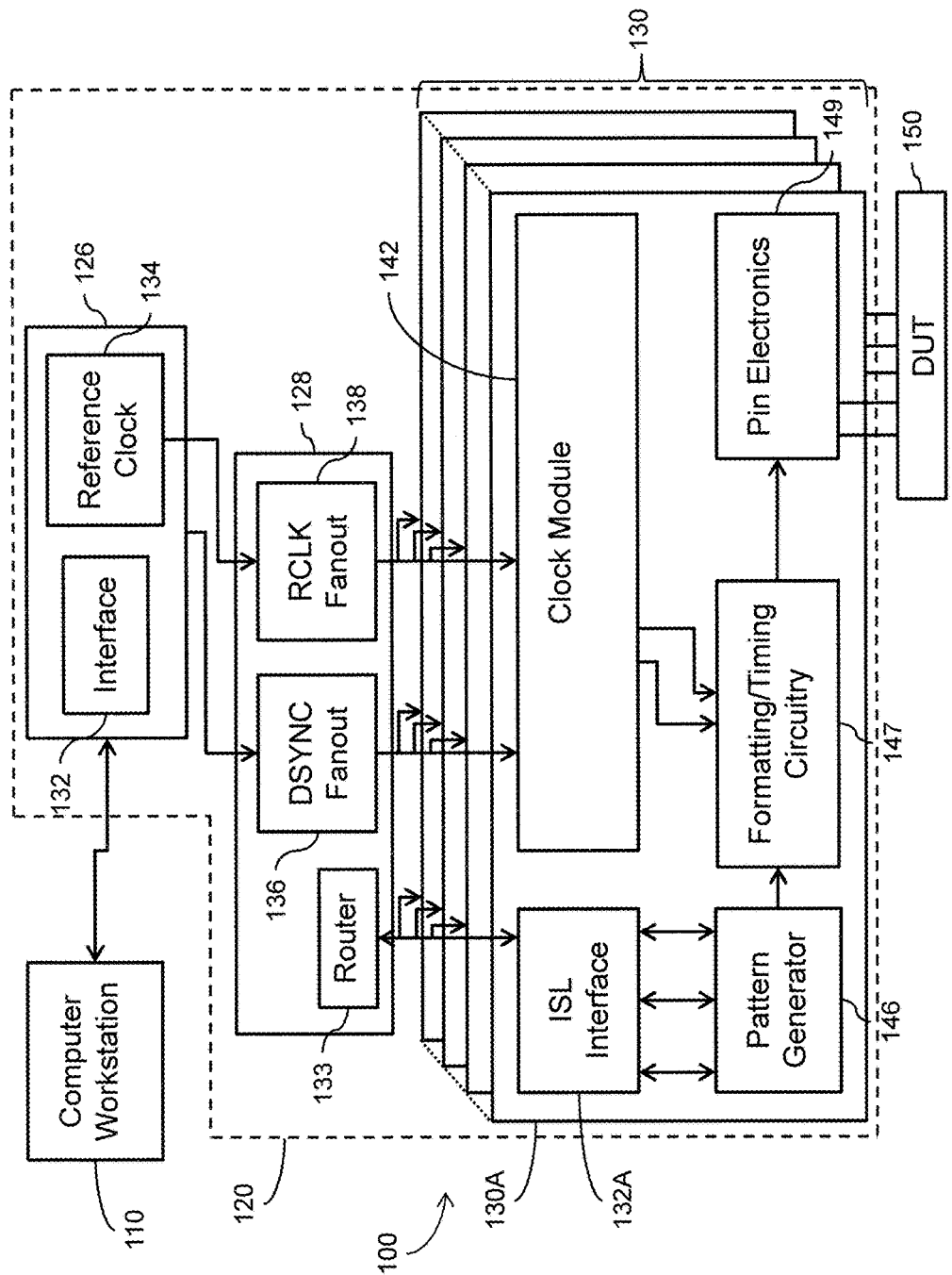
FIG. 1 is a block diagram of an automatic test system in which some embodiments may be applied.

FIG. 1 illustrates an embodiment of an automatic test system or tester, generally designated 100, that may include a computer workstation 110 and a test head 120 (in phantom). The test head may house a plurality of electronic board assemblies for generating and measuring test signals, including central card 126, distribution card 128, and multiple instrument cards 130.

As illustrated in FIG. 1, the central card 126 may feed signals to distribution card 128 for distribution to an array of instrument cards 130. The central card 126 may include a computer interface 132 that ties the workstation 110 to the testhead board assemblies, and a reference clock generator 134 that generates a low frequency reference clock, denoted RCLK. The reference clock generator may comprise, for example, a 100 or 400 MHz crystal oscillator. Computer interface 132 may allow the tester to be interfaced to a computer work station 110, through which a user may develop test programs that can be loaded into tester 120. Computer work station 110 may provide a user with other capabilities, such as initiating execution of previously developed test programs or analyzing test results.

The central card 126 may include control circuitry that generates control signals responsive to commands from the workstation. One of the control signals may comprise a "DSYNC" signal. The DSYNC signal may provide a reference time to all instruments or other components intended to have synchronized operation. The reference clock signal and the DSYNC signal may be fanned-out, or distributed, along DSYNC and RCLK fan-out circuitry 136 and 138, respectively, disposed on the distribution of card 128. Distribution of these signals may allow pattern generators on multiple instruments to be started and operate in unison.

The instruments on instrument cards 130 may be digital or analog instruments or may perform functions involving digital and analog signals. Instrument 130A depicts a digital instrument, also called a "channel card." A channel card may contain electronic resources for multiple tester channels. A test system is likely to include multiple channel cards.

As shown in FIG. 1, each instrument card includes circuitry to perform the desired function of the instrument. In the case of a digital instrument such as 130A, the functional circuitry may include formatting/timing circuitry 147 and pin electronics circuitry 149. This circuitry can generate and measure digital signals for testing a device under test (DUT) 150.

In addition, digital instrument 130A may include a pattern generator 146. Pattern generator 146 may provide a sequence of commands that control the functional portions of instrument 130A. Pattern generator 146 may provide branching in response to certain conditions or execute other conditional functions based on a status of the test system. Pattern generator 146 may be clocked by a clock from local clock module 142 and may therefore provide instructions at a programmable rate, which may be higher than the frequency of the reference clock.

In addition, instrument 130A may include an instrument synchronization link (ISL) interface 132A. ISL interface 132A may allow pattern generator 146 to communicate with other instruments, which may similarly contain an ISL interface. Pattern generator 146 may send commands to be executed by the functional circuitry of other instruments or receive status information from other instruments that may, for example, be used to control conditional branching.

Other instruments may have different functional circuitry, depending on the specific function to be implemented by the instrument. In the described embodiment, each instrument card may include a clock module 142. However, as noted above, each instrument may have none, one, or more clock modules.

As shown in FIG. 1, each channel card 130A may include a clock module 142. Clock module 142 may be programmed to generate one or more clocks of a desired frequency from RCLK. In the described embodiment, each of the clocks generated by a clock module 142 is intended to be used "locally," i.e., within the instrument or board containing the clock generator. A clock generator may generate clocks of several different frequencies. Because all of the clocks are generated from the same source, the clocks may be considered synchronous with each other. However, it should be appreciated that the number of clocks generated in a clock module, and whether those clocks are used locally or distributed to other instruments, is not critical.

Figure 2:
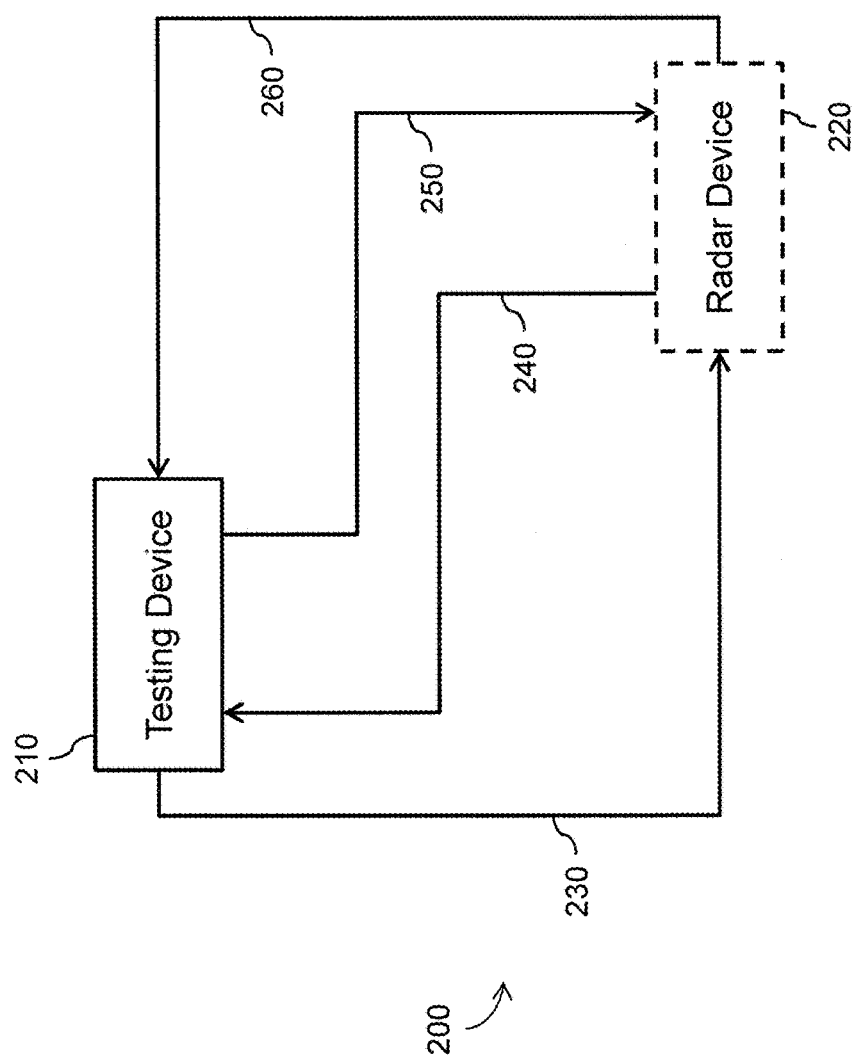
FIG. 2 is a block diagram illustrating a testing environment in accordance with some embodiments.

FIG. 2 illustrates a testing environment 200 according to some embodiments, including a testing device 210 and a radar device 220. The radar device 220 may correspond to DUT 150. In some embodiments, the testing device 210 may use functional testing, which may include testing the functionality of the radar device 220 in the radar device's 220 normal mode of operation.

Figure 5:
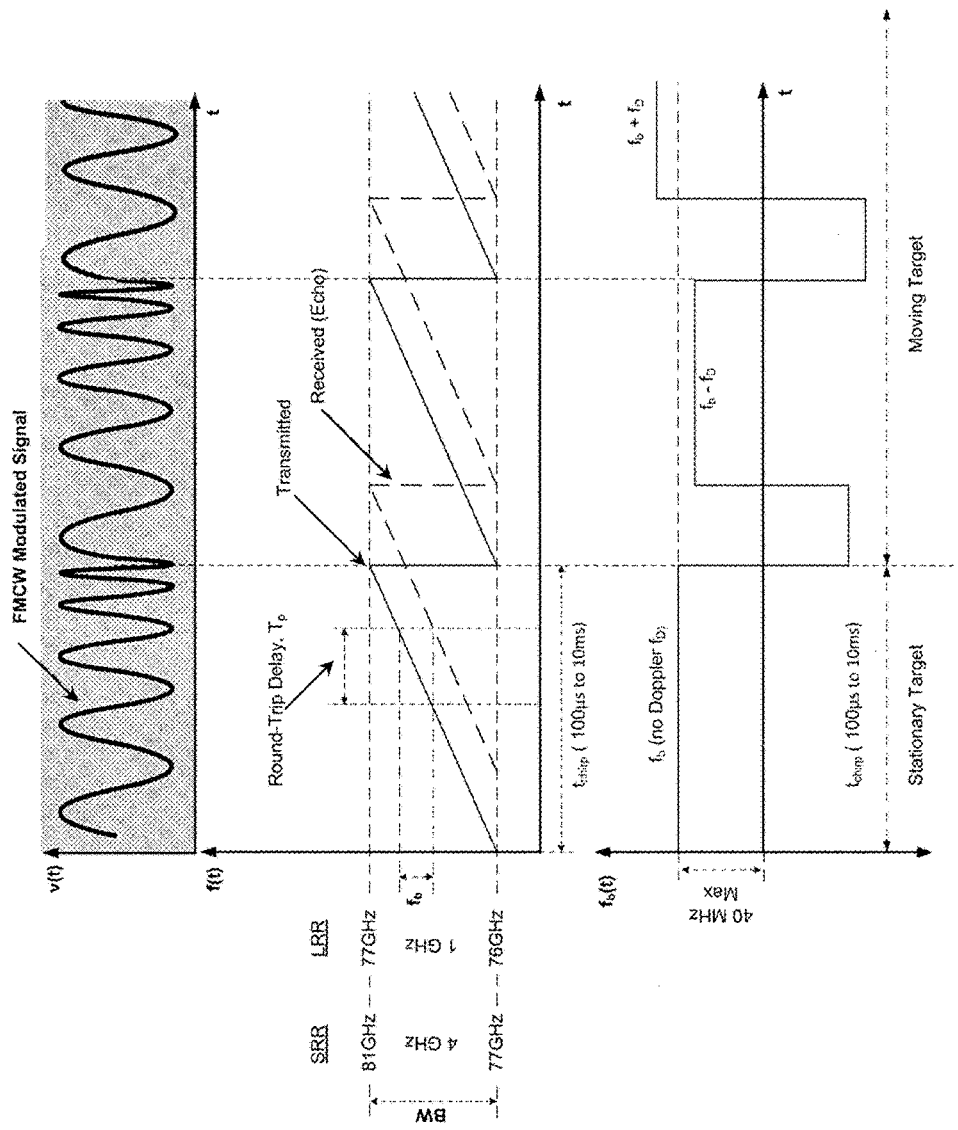
FIG. 5 is a collection of exemplary time diagrams in accordance with some embodiments.

In some embodiments, the testing device 210 may determine a first frequency difference between a frequency of a first signal 230 (from the testing device 210) or a second signal 240 (from the radar device 220) and a frequency of a third signal 250 (also from the testing device 210) based on a first distance value. For example, the first distance value may be the desired distance that the testing device 210 may test on the radar device 220. The testing device 210 may use this first distance value to determine the first frequency difference. The first frequency difference may be referred to as the beat signal frequency $f_b$ (an example of which is shown in FIG. 5) or the IF signal.

In some embodiments, the testing device 210 may also transmit the first signal 230 to the radar device 220. The testing device 210 may receive the second signal 240 from the radar device 220. Alternatively, the testing device 210 may not receive the second signal 240 from the radar device 220, but may operate completely independently of the second signal 240. The testing device 210 may additionally transmit the third signal 250 at an offset relative to at least one of the first signal 230 and the second signal 240 based on the first frequency difference.

The testing device 210 may further receive from the radar device 220 a fourth signal 260 indicating a second distance value or a second frequency difference between the frequency of the second signal 240 and the frequency of the third signal 250, determined by the radar device 220, for comparison with the first distance value or the first frequency difference. The second distance value may be a calculation of the distance between the radar device 220 and the target object determined by the radar device 220. The second frequency difference may also be referred to as the beat signal frequency $f_b$ or the IF signal. In some embodiments, the testing device 210 may compare the second frequency difference with the first frequency difference in order to test whether the radar device 220 is operating properly. Alternatively or additionally, the testing device 210 may compare the second distance value with the first distance value in order to test whether the radar device 220 is operating properly.

In some embodiments, the first signal 230 may comprise a control signal (e.g., a voltage signal), the second signal 240 may comprise a radar signal, and the third signal 250 may comprise a delay signal of the radar signal (i.e., a signal delayed relative to the second signal 240). For example, the third signal 250 may simulate/emulate an echo signal created by reflection of the second signal 240 from a physical target object, an actual instance of which may be delayed relative to the radar signal based on the distance between the target object and the radar device 220. The inventors have recognized and appreciated that this way, the desired distance or distances to a target object may be simulated with lower cost, less time, and less space usage than in conventional techniques. Alternatively, the third signal 250 may comprise a summation of an emulated echo signal and one or more emulated interfering signals. In some embodiments, the emulated interfering signals may emulate a radar signal competing with the second signal 240 and/or the third signal 250. Alternatively or additionally, the emulated interfering signals may emulate one or more electro-magnetic radiation sources unrelated to the radar device 220.

In some embodiments, the first signal 230 may comprise a radio frequency signal rather than a control or voltage signal.

In some embodiments, the third signal 250 may be identical in form to the second signal 240. For example, the third signal 250 may have the same waveform as the second signal 240 (an example of which is shown in FIG. 5). Alternatively, the third signal 250 may be different in form as compared to the second signal 240. For example, in embodiments in which the third signal 250 may comprise a summation of an emulated echo signal and one or more emulated interfering signals, the third signal 250 may have a waveform different from that of the second signal 240.

In some embodiments, the first distance value may comprise a measure of distance stored in a memory of the testing device 210 and/or entered by a user of the testing device 210 at any time, whether before or during testing. In some embodiments, testing may occur automatically based on initial user input or no user input. The first distance value may be the distance that the testing device 210 may simulate for the radar device 220 as described above. The testing device 210 may use the first signal 230, the second signal 240, the third signal 250, the fourth signal 260, and/or any other suitable signals or components to simulate this distance and test the radar device 220.

In some embodiments, the offset may comprise a delay relative to at least one of transmitting the first signal 230 to the radar device 220 and receiving the second signal 240 from the radar device 220. For example, the offset may create a time delay between transmitting the third signal 250 and transmitting the first signal 230 and/or receiving the second signal 240. Alternatively, the offset may comprise a frequency offset relative to at least one of the first signal 230 and the second signal 240. For example, the offset may shift the frequency of the third signal 250 relative to the first signal 230 and/or the second signal 240.

In some embodiments, the second signal 240 and the third signal 250 may each comprise time-delayed or frequency-modulated signals. For example, the second signal 240 and the third signal 250 may each be frequency-modulated continuous-wave (FMCW) signals (an example of which is shown in FIG. 5). This may be advantageous because the use of FMCW signals may replicate real world operation of a radar device. As compared to an alternative such as parametric testing using unmodulated continuous-wave signals, which may provide incomplete test coverage, using FMCW signals may provide complete test coverage with functional testing of the radar device 220. Alternatively, the second signal 240 and the third signal 250 may each be pulse modulated signals, pulse FMCW signals, spread spectrum signals, binary phase-shift keying signals, or any other suitable signals.

In some embodiments, as described above, the fourth signal 260 may indicate a second distance value, which may be determined by the radar device 220, for comparison with the first distance value. For example, alternatively or additionally to indicating a frequency difference for comparison with the first frequency difference as described above, the fourth signal 260 may indicate a distance value for comparison with the first distance value. The testing device 210 may use this as an alternative or additional way to test whether the radar device 220 is operating properly. Alternatively, the testing device 210 may itself determine a second distance value based on the second frequency difference for comparison with the first distance value. The second distance value may be the estimate of the distance to the target object made by the radar device 220.

Figure 3:
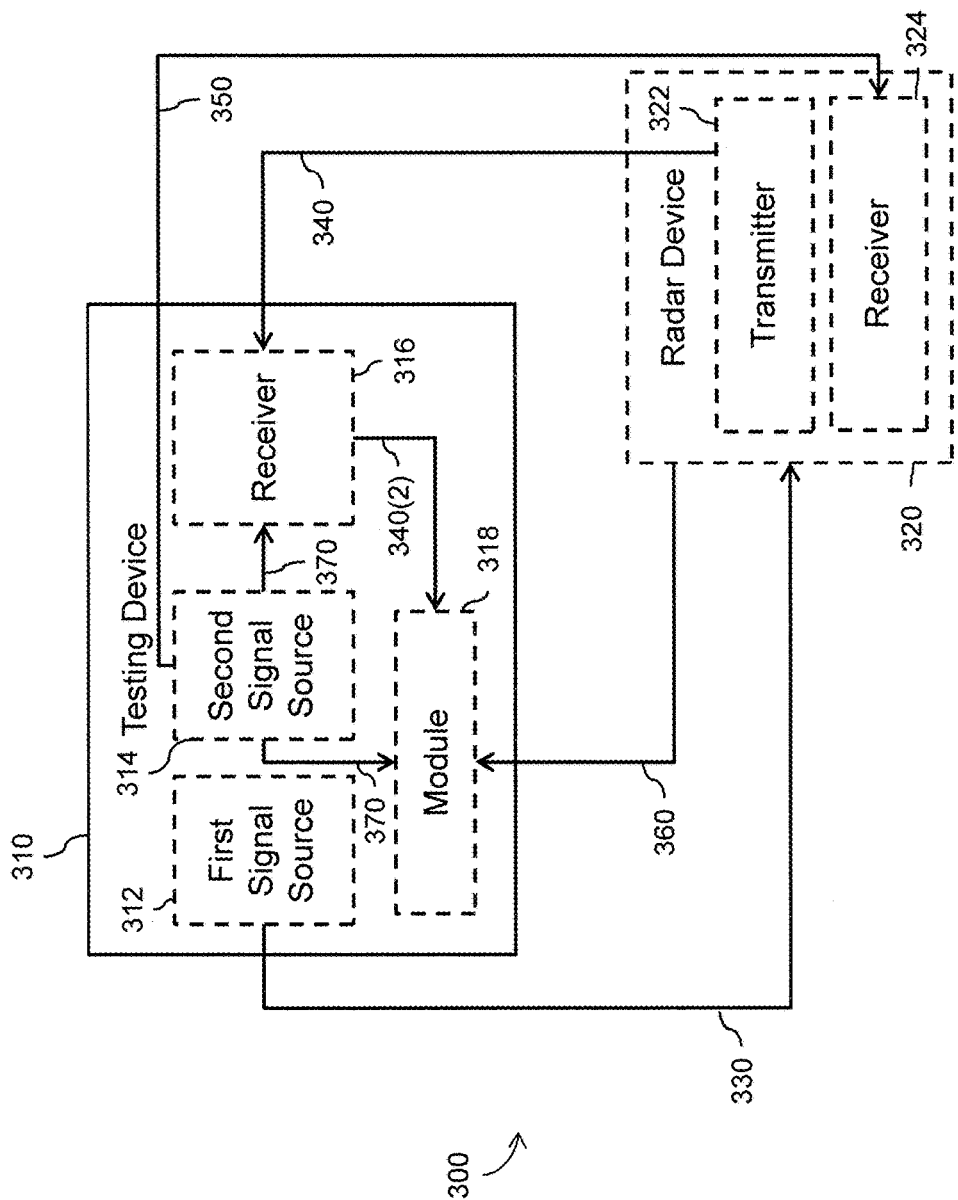
FIG. 3 is a block diagram illustrating an additional testing environment in accordance with some embodiments.

FIG. 3 illustrates a testing environment 300 according to some embodiments, including a testing device 310 (which may correspond to testing device 210) and a radar device 320 (which may correspond to radar device 220). In some embodiments, the testing device 310 may include a first signal source 312, a second signal source 314, a receiver 316, and a module 318. The first signal source 312 may produce a first signal 330 (which may correspond to first signal 230). The second signal source 314 may produce a third signal 350 (which may correspond to third signal 250). The receiver 316 may receive a second signal 340 (which may correspond to second signal 240) from the radar device 320. The second signal 340 may be relayed, alternatively or additionally, from the receiver 316 to the module 318 (as shown by 340(2)). Alternatively or additionally, 340(2) may be any other suitable signal relayed from the receiver 316 to the module 318. The frequency of the third signal 350 may also be relayed to the module 318.

In some embodiments, the module 318 may receive a second frequency difference—for example, in or indicated by a fourth signal 360 (which may correspond to fourth signal 260)—from the radar device 320 and determine a second distance value based on the second frequency difference for comparison with a first distance value.

In some embodiments, the second signal source 314 may produce a fifth signal 370 on which the third signal 350 may be based. For example, the fifth signal 370 may be a LO signal offset from the second signal 340, which the testing device 310 may use to produce the third signal 350.

In some embodiments, the first signal 330 and the third signal 350 may be synchronized with respect to each other. Additionally, the first signal source 312 and the second signal source 314 may be synchronized with respect to each other. Alternatively or additionally, the first signal source 312 and the second signal source 314 may be independent of each other. In some embodiments, this synchronization may include starting the second signal source 314 a certain amount of time later than the first signal source 312 (i.e., the second signal source 314 may be delayed relative to the first signal source 312). This amount of time or delay in start time between the first signal source 312 and the second signal source 314 may be proportional to the first distance value, which may be the distance to be simulated, based on physical laws of signal transmission. Alternatively or additionally, a frequency offset may be used between the first signal source 312 and the second signal source 314.

In some embodiments, the radar device 320 may include a transmitter 322 and/or a receiver 324. The transmitter 322 may transmit the second signal 340 to the receiver 316 of the testing device 310. The receiver 324 may receive the third signal 350 from the second signal source 314 of the testing device 310.

Figure 4:
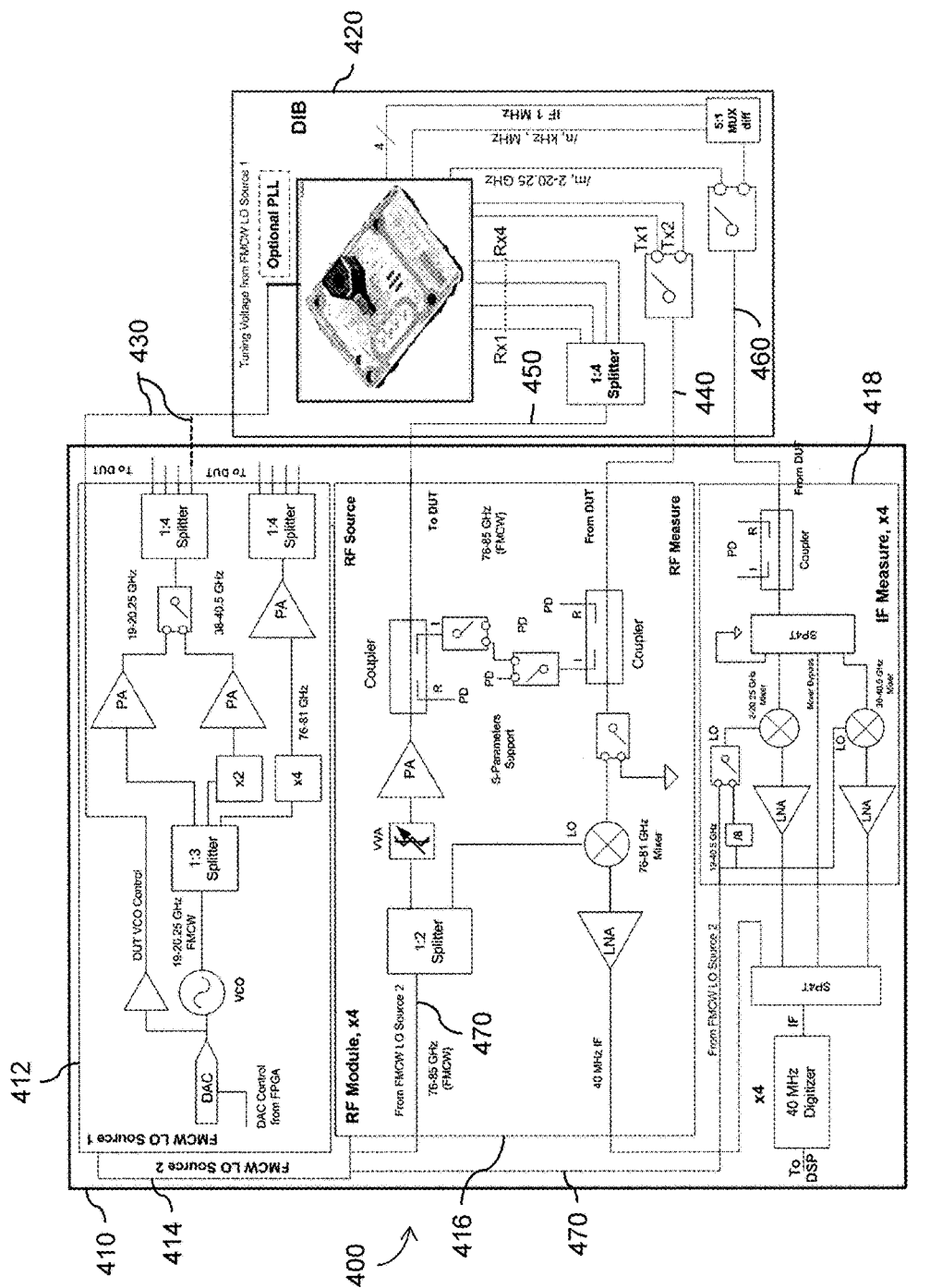
FIG. 4 is a schematic illustrating a further testing environment in accordance with some embodiments.

FIG. 4 illustrates a testing environment 400 according to some embodiments, including a testing device 410 (which may correspond to testing device 210) and a device interface board with radar device 420 (some or all of which may correspond to radar device 220). In some embodiments, the testing device 410 may include a FMCW local oscillator (LO) source 1 412 (which may correspond to first signal source 312), a FMCW LO source 2 414 (which may correspond to second signal source 314), between one and four or more radio frequency (RF) modules 416 (which may correspond at least in part to receiver 316), and between one and four or more intermediate frequency (IF) measure modules 418 (which may correspond to module 318). Any other suitable number of RF modules 416 and IF measure modules 418 may be used. The multiple source and measure paths may enable the testing device 410 to test four or any other suitable number of sites.

In some embodiments, the FMCW LO sources 1 412 and 2 414 may use frequencies at or about 19-20.25 gigahertz, 38-40.5 gigahertz, 76-85 gigahertz, and/or any other suitable frequencies. Frequencies at or about 76-81 gigahertz may be advantageous for a number of reasons. For example, these frequencies may provide higher reliability, accuracy (including higher spatial resolution), and integration ability, as well as smaller size, potentially one third of the emission power requirements, and a common platform concept for short range radar (SRR), medium range radar (MRR), and long range radar (LRR) rather than needing to use, for example, 24 gigahertz for SRR and 77 gigahertz for LRR, which is less cost effective.

The RF module(s) 416 may eliminate the need for additional RF instruments and/or RF installation, which may further reduce the cost of some embodiments by simplifying configuration and freeing a tester slot. Moreover, this may enable migration to testing of a radar device in module and final assembly forms as well as portability across platforms (i.e., being platform agnostic). A testing device 410 may be a general purpose automated testing device, rather than a dedicated automotive radar test.

In some embodiments, as illustrated in FIG. 4, the testing device 410 may also include between one and four or more digitizers (e.g., 40 megahertz digitizer(s)) and single-pole, four-throw switches (SP4T). The digitizer(s) may be integrated for both transmission and IF measurements. The IF measure module(s) 418 may include a divider, one or more low noise amplifiers (LNA), a single-pole, double-throw switch (SPDT), one or more mixers (e.g., a 2-20.25 gigahertz mixer and a 38-40.5 gigahertz mixer), a SP4T, and a coupler. Each of the FMCW LO source 1 412 and the FMCW LO source 2 414 may include a digital-to-analog converter (DAC), one or more power amplifiers (PA), a voltage controlled oscillator (VCO), a 1:3 splitter, one or more multipliers, a SPDT, and one or more 1:4 splitters. The RF module(s) 416 may include a 1:2 splitter, a LNA, a voltage variable attenuator (VVA), a PA, one or more SPDTs, and one or more couplers. Additionally, the RF module(s) 416 may provide scattering parameters (S-Parameters) support. It should be appreciated that any other suitable components of any suitable quantities may be included alternatively or additionally to those described.

In some embodiments, the device interface board with radar device 420 may include one or more receivers Rx1 through Rx4, a phase locked loop (PLL), a 1:4 splitter, one or more transmitters including Tx1 and Tx2 (some of which may correspond to transmitter 322), and a 5:1 multiplexer. It should be appreciated that any other number of components may be used (e.g., more than four receivers Rx1 through Rx4 and/or more than two receivers Tx1 and Tx2) and any other type of splitter or multiplexer may be used alternatively or additionally to those described.

In some embodiments, the FMCW LO source 1 412 may produce a first signal 430 (which may correspond to first signal 230). The FMCW LO source 2 414 may produce a third signal 450 (which may correspond to third signal 250). The RF modules 416 may receive a second signal 440 (which may correspond to second signal 240) from the radar device 420. The IF measure modules 418 may receive a second frequency difference—for example, in or indicated by a fourth signal 460 (which may correspond to fourth signal 260)—from the radar device 420 and determine a second distance value based on the second frequency difference for comparison with a first distance value.

In some embodiments, the FMCW LO source 2 414 may produce a fifth signal 470 on which the third signal 450 may be based. For example, the fifth signal 470 may be a LO signal offset from the second signal 440, which the testing device 410 may use to produce the third signal 450.

FIG. 5 illustrates a collection of exemplary time diagrams according to some embodiments. The top time diagram illustrates an exemplary FMCW signal that may be used in some embodiments, with voltage plotted relative to time. The middle time diagram illustrates two exemplary FMCW signals with frequency plotted relative to time. The signal in solid lines is an exemplary transmitted FMCW signal, while the signal in dashed lines is an exemplary received (echo) signal, as shown. The two exemplary FMCW signals are offset such that a round-trip delay and ($T_p$) and $f_b$ exist. The signals have bandwidth (BW) as shown, as well as chirp time ($t_{chirp}$) as shown, which may be referred to as the duration of the ramp of the signal(s). Categorization of bandwidth to SRR and LRR is also shown.

The bottom time diagram illustrates an exemplary $f_b$ or IF signal with frequency plotted relative to time for a stationary target object on the far left side and a moving target object in the center and on the right side. The effect of Doppler ($f_D$) is also shown.

In some embodiments, the determinations discussed herein may be made using the following relationship, where R may be the distance between the radar device 420 and the target object and c may be the speed of light in any suitable medium.

$$f_b = f_{IF} = f_{transmitted} - f_{received} = \frac{2R}{c} \frac{BW}{t_{chirp}}$$

Any other suitable relationship may be used alternatively or additionally to this relationship.

Figure 6:
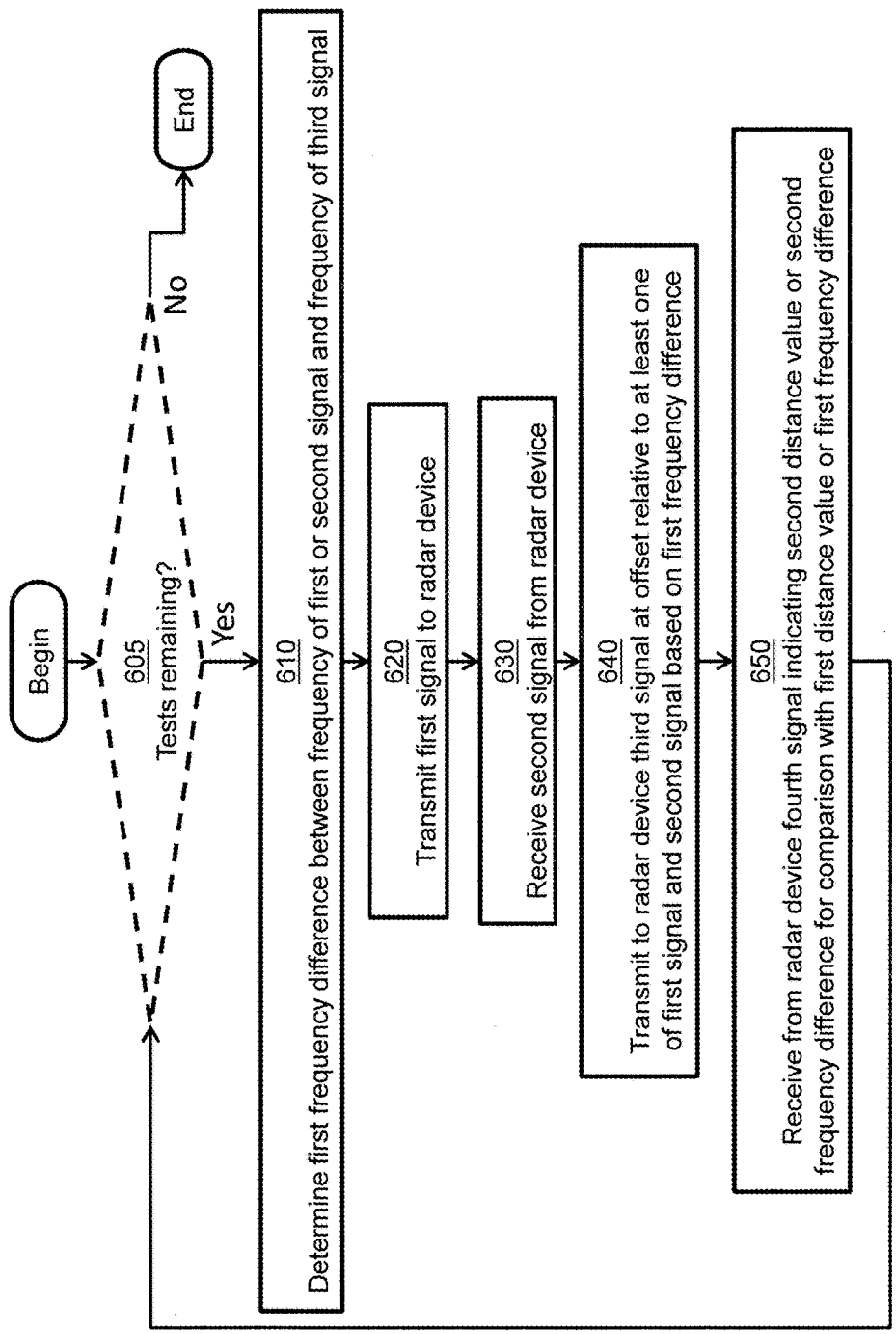
FIG. 6 is a flowchart of a method of testing a radar device in accordance with some embodiments.

FIG. 6 is a flowchart of a method of testing a radar device according to some embodiments. In some embodiments, the method may begin at stage 605. At stage 605, it may be determined whether any tests, such as different distance values, of the radar device (which may correspond to radar device 220) remain. If no tests remain, the method may end. On the other hand, if tests do remain, the method may proceed to stage 610.

At stage 610, a first frequency difference between a frequency of a first signal (which may correspond to first signal 230) or a second signal (which may correspond to second signal 240) and a frequency of a third signal (which may correspond to third signal 250) may be determined based on a first distance value. The method may then proceed to stage 620.

At stage 620, the first signal may be transmitted to the radar device. The method may then proceed to stage 630.

At stage 630, the second signal may be received from the radar device. The method may then proceed to stage 640.

At stage 640, the third signal may be transmitted to the radar device at an offset relative to the first signal and/or the second signal based on the first frequency difference. The method may then proceed to stage 650.

At stage 650, a fourth signal (which may correspond to fourth signal 260) indicating a second distance value or a second frequency difference between the frequency of the second signal and the frequency of the third signal may be received. This fourth signal may be used for comparison with the first distance value or the first frequency difference. For example, the radar device may be tested in this way. The method may then return to stage 605, and may repeat for any other distance value(s) at which the radar device may be tested, as described above. Other methods for testing the radar device may modify these stages in any suitable way, including adding stages, deleting stages, and/or modifying any sequence of stages.

Figure 7:
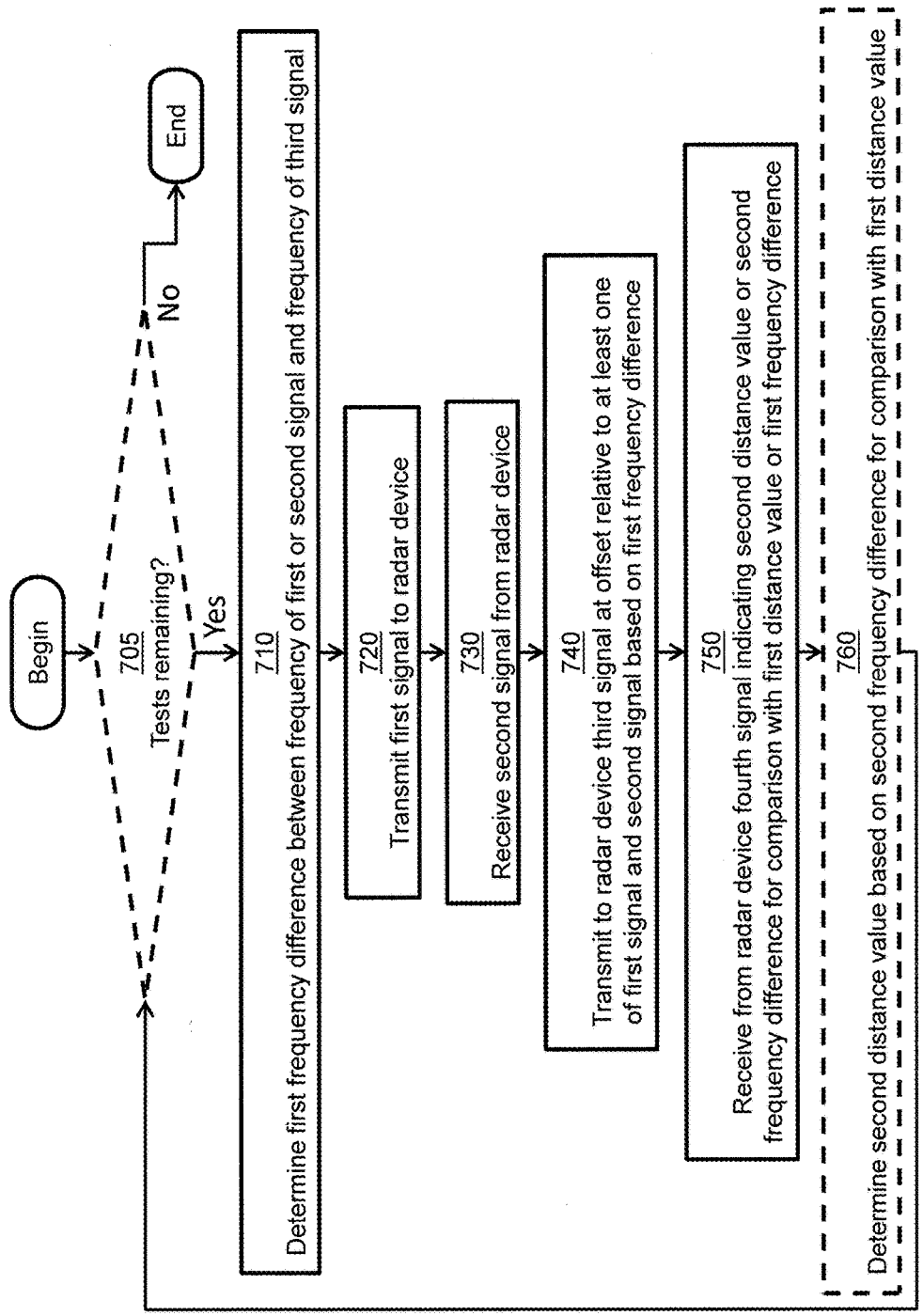
FIG. 7 is a flowchart of an additional method of testing a radar device in accordance with some embodiments.

FIG. 7 is a flowchart of a method of testing a radar device according to some embodiments. In some embodiments, the method may begin at stage 705. At stage 705, it may be determined whether any tests of the radar device remain. If no tests remain, the method may end. On the other hand, if tests do remain, the method may proceed to stage 710.

At stage 710, a first frequency difference between a frequency of a first signal (which may correspond to first signal 230) or a second signal (which may correspond to second signal 240) and a frequency of a third signal (which may correspond to third signal 250) may be determined based on a first distance value. The method may then proceed to stage 720.

At stage 720, the first signal may be transmitted to the radar device. The method may then proceed to stage 730.

At stage 730, the second signal may be received from the radar device. The method may then proceed to stage 740.

At stage 740, the third signal may be transmitted to the radar device at an offset relative to the first signal and/or the second signal based on the first frequency difference. The method may then proceed to stage 750.

At stage 750, a fourth signal (which may correspond to fourth signal 260) indicating a second frequency difference between the frequency of the second signal and the frequency of the third signal may be received. This second frequency difference may be used for comparison with the first frequency difference as a way to test the radar device. The method may then proceed to stage 760.

At stage 760, a second distance value based on the second frequency difference may be determined. In some embodiments, this second distance value may be determined based on the second frequency difference, the bandwidth of the second signal and the third signal, and the duration of the ramp of the second signal and the third signal (e.g., see the relationship above). In some embodiments, this second distance value may be used for comparison with the first distance value as an alternative or additional way to test the radar device. The method may then return to stage 705, and may repeat for any other distance value(s) at which the radar device may be tested, as described above. Other methods for testing the radar device may modify these stages in any suitable way, including adding stages, deleting stages, and/ or modifying any sequence of stages.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, circuits and modules depicted and described may be reordered in any order, and signals may be provided to enable reordering accordingly.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A testing device for testing a radar device, the testing device being configured to:
   determine, based on a first distance value, a first frequency difference between a frequency of a first signal or a second signal and a frequency of a third signal;
   transmit to the radar device the first signal;
   receive the second signal from the radar device;
   transmit to the radar device the third signal at an offset relative to at least one of the first signal and the second signal, the offset being based on the first frequency difference; and
   receive from the radar device a fourth signal for comparison with the first distance value or the first frequency difference, wherein the fourth signal indicates a second distance value determined by the radar device or a second frequency difference determined by the radar device between the frequency of the second signal and the frequency of the third signal.

2. The testing device of claim 1, wherein:
   the first signal and the third signal are synchronized.

3. The testing device of claim 1, wherein:
   the offset comprises a delay relative to at least one of transmitting to the radar device the first signal and receiving the second signal from the radar device.

4. The testing device of claim 1, wherein:
   the offset comprises a frequency offset relative to the at least one of the first signal and the second signal.

5. The testing device of claim 1, wherein:
   the first signal comprises a control signal, the second signal comprises a radar signal, and the third signal comprises a delay signal of the radar signal.

6. The testing device of claim 1, wherein:
the first signal comprises a radio frequency signal, the second signal comprises a radar signal, and the third signal comprises a delay signal of the radar signal.
7. The testing device of claim 1, wherein:
the first signal comprises a control signal, the second signal comprises a radar signal, and the third signal comprises a summation of an emulated echo signal and one or more emulated interfering signals.
8. The testing device of claim 7, wherein:
the one or more emulated interfering signals emulate a competing radar signal.
9. The testing device of claim 7, wherein:
the one or more emulated interfering signals emulate one or more electro-magnetic radiation sources unrelated to the radar device.
10. The testing device of claim 1, wherein:
the second signal comprises a first time-delayed or frequency-modulated signal and the third signal comprises a second time-delayed or frequency-modulated signal.
11. The testing device of claim 10, wherein:
the second signal comprises a first frequency-modulated continuous-wave signal and the third signal comprises a second frequency-modulated continuous-wave signal.
12. The testing device of claim 1, wherein:
the testing device is further configured to:
determine the second distance value based on the second frequency difference for comparison with the first distance value.
13. The testing device of claim 1, wherein:
the testing device includes:
a first signal source configured to produce the first signal;
a second signal source configured to produce a fifth signal on which the third signal is based;
a receiver configured to receive the second signal from the radar device; and
a module configured to receive the fourth signal from the radar device and/or to determine the second distance value based on the second frequency difference for comparison with the first distance value.
14. A method of testing a radar device, the method comprising:
determining, based on a first distance value, a first frequency difference between a frequency of a first signal or a second signal and a frequency of a third signal;
transmitting to the radar device the first signal;
receiving the second signal from the radar device;
transmitting to the radar device the third signal at an offset relative to at least one of the first signal and the second signal, the offset being based on the first frequency difference; and
receiving from the radar device a fourth signal for comparison with the first distance value or the first frequency difference, wherein the fourth signal indicates a second distance value determined by the radar device or a second frequency difference determined by the radar device between the frequency of the second signal and the frequency of the third signal.
15. The method of claim 14, wherein:
the first signal and the third signal are synchronized.
16. The method of claim 14, wherein:
the offset comprises a delay relative to at least one of transmitting to the radar device the first signal and receiving the second signal from the radar device.
17. The method of claim 14, wherein:
the offset comprises a frequency offset relative to the at least one of the first signal and the second signal.
18. The method of claim 14, wherein:
the first signal comprises a control signal, the second signal comprises a radar signal, and the third signal comprises a delay signal of the radar signal.
19. The method of claim 14, wherein:
the first signal comprises a radio frequency signal, the second signal comprises a radar signal, and the third signal comprises a delay signal of the radar signal.
20. The method of claim 14, wherein:
the first signal comprises a control signal, the second signal comprises a radar signal, and the third signal comprises a summation of an emulated echo signal and one or more emulated interfering signals.
21. The method of claim 20, wherein:
the one or more emulated interfering signals emulate a competing radar signal.
22. The method of claim 20, wherein:
the one or more emulated interfering signals emulate one or more electro-magnetic radiation sources unrelated to the radar device.
23. The method of claim 14, wherein:
the second signal comprises a first time-delayed or frequency-modulated signal and the third signal comprises a second time-delayed or frequency-modulated signal.
24. The method of claim 23, wherein:
the second signal comprises a first frequency-modulated continuous-wave signal and the third signal comprises a second frequency-modulated continuous-wave signal.
25. The method of claim 14, further comprising:
determining the second distance value based on the second frequency difference for comparison with the first distance value.
26. The method of claim 25, wherein:
determining the second distance value based on the second frequency difference comprises determining the second distance value based on the second frequency difference, a bandwidth of the second signal and the third signal, and a duration of a ramp of the second signal and the third signal.
27. The method of claim 14, further comprising:
determining whether any tests of the radar device remain; and
in response to determining that no tests of the radar device remain, terminating the method.
28. A system configured for testing a radar device, the system comprising:
a testing device configured to:
determine, based on a first distance value, a first frequency difference between a frequency of a first signal or a second signal and a frequency of a third signal;
transmit to the radar device the first signal;
receive the second signal from the radar device;
transmit to the radar device the third signal at an offset relative to at least one of the first signal and the second signal, the offset being based on the first frequency difference; and
receive from the radar device a fourth signal for comparison with the first distance value or the first frequency difference, wherein the fourth signal indicates a second distance value determined by the radar device or a second frequency difference determined by the radar device between the frequency of the second signal and the frequency of the third signal; and a radar device configured to:
receive the first signal from the testing device;
transmit to the testing device the second signal;
receive the third signal from the testing device; and
transmit to the testing device the fourth signal.

29. The system of claim 28, wherein:
the first signal and the third signal are synchronized.

30. The system of claim 28, wherein:
the offset comprises a delay relative to at least one of transmitting to the radar device the first signal and receiving the second signal from the radar device.

31. The system of claim 28, wherein:
the offset comprises a frequency offset relative to the at least one of the first signal and the second signal.

32. The system of claim 28, wherein:
the first signal comprises a control signal, the second signal comprises a radar signal, and the third signal comprises a delay signal of the radar signal.

33. The system of claim 28, wherein:
the first signal comprises a radio frequency signal, the second signal comprises a radar signal, and the third signal comprises a delay signal of the radar signal.

34. The system of claim 28, wherein:
the first signal comprises a control signal, the second signal comprises a radar signal, and the third signal comprises a summation of an emulated echo signal and one or more emulated interfering signals.

35. The system of claim 34, wherein:
the one or more emulated interfering signals emulate a competing radar signal.

36. The system of claim 34, wherein:
the one or more emulated interfering signals emulate one or more electro-magnetic radiation sources unrelated to the radar device.

37. The system of claim 28, wherein:
the second signal comprises a first time-delayed or frequency-modulated signal and the third signal comprises a second time-delayed or frequency-modulated signal.

38. The system of claim 37, wherein:
the second signal comprises a first frequency-modulated continuous-wave signal and the third signal comprises a second frequency-modulated continuous-wave signal.

39. The system of claim 28, wherein:
the testing device is further configured to:
determine the second distance value based on the second frequency difference for comparison with the first distance value.

40. The system of claim 28, wherein:
the testing device includes:
a first signal source configured to produce the first signal;
a second signal source configured to produce a fifth signal on which the third signal is based;
a receiver configured to receive the second signal from the radar device; and
a module configured to receive the fourth signal from the radar device and/or to determine the second distance value based on the second frequency difference for comparison with the first distance value; and
the radar device includes:
a transmitter configured to transmit to the receiver the second signal.

* * * * *